(12) United States Patent
Chen

(10) Patent No.: US 7,296,596 B1
(45) Date of Patent: Nov. 20, 2007

(54) WATER MIXING SINGLE HANDLE FAUCET FITTED WITH A WATER INLET AND OUTLET

(75) Inventor: Mary Chen, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 229 days.

(21) Appl. No.: 11/085,021

(22) Filed: Mar. 21, 2005

(51) Int. Cl.
*F16K 21/00* (2006.01)

(52) U.S. Cl. .......................................... 137/801; 4/676

(58) Field of Classification Search ................ 137/801, 137/625.4; 4/675–678
See application file for complete search history.

(56) References Cited

U.S. PATENT DOCUMENTS

| | | | | | |
|---|---|---|---|---|---|
| 3,965,936 | A | * | 6/1976 | Lyon ..................... | 137/625.17 |
| 5,329,958 | A | * | 7/1994 | Bosio ..................... | 137/269 |
| 5,368,071 | A | * | 11/1994 | Hsieh ..................... | 137/625.41 |
| 5,375,624 | A | * | 12/1994 | Knapp ..................... | 137/625.17 |
| 5,853,023 | A | * | 12/1998 | Orlandi et al. ............ | 137/271 |
| 5,857,489 | A | * | 1/1999 | Chang ..................... | 137/625.17 |
| 6,070,611 | A | * | 6/2000 | Becker ..................... | 137/625.4 |
| 2004/0094213 | A1 | * | 5/2004 | Knapp ..................... | 137/625.17 |

* cited by examiner

*Primary Examiner*—Gregory Huson
*Assistant Examiner*—Craig Schneider
(74) *Attorney, Agent, or Firm*—Egbert Law Offices

(57) ABSTRACT

The water mixing single handle faucet fitted with a water inlet and outlet includes circular groove, located on the first baffle plate to accommodate the valve core, a valve core location hole, cold water inlet, hot water inlet and water outlet mounted onto the first baffle plate. The cold water inlet is connected to a cold water inlet pipe, hot water inlet connected to hot water inlet pipe, and water outlet connected to water outlet pipe on the main body. The water outlet is located nearby outflow side of the faucet while cold/hot water inlet is located at the remote side. The present invention can thus ensure an easier machining and moulding of bar copper in order to promote the rate of finished products and minimize the manufacturing cost.

1 Claim, 2 Drawing Sheets

WATER MIXING SINGLE HANDLE FAUCET FITTED WITH A WATER INLET AND OUTLET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a single handle water mixing faucet.

BACKGROUND OF THE INVENTION

Currently, a single handle water mixing faucet is widely applied because of its ease-of-operation. However, since cold/hot water inlet is located at a frontal section and water outlet at rear section of baffle plate of the faucet (e.g. T-shaped faucet), it will likely make it difficult for moulding of baffle plate, where air pockets will be easily formed, thus leading to a higher degree of defects and manufacturing cost. Besides, considering that cold/hot water inlet is located at frontal section and bar copper is applied to machine-shaping of column faucet, pipe column of water inlet is vulnerable to puncture during machining of water outlet tube orifice, causing serious concern to a higher defective rate.

Thus, to overcome the aforementioned problems of the prior art single handle water mixing faucet, it would be an advancement in the art to provide an improved one of desirable performance.

To this end, the present invention is directed to an improved structure of water mixing single handle faucet fitted with a water inlet and outlet, which can ensure an easier machining and moulding of bar copper in order to promote the rate of finished products and minimize the manufacturing cost.

BRIEF SUMMARY OF THE INVENTION

The enhanced efficacy of the present invention is as follows: owing to the fact that water outlet 33 on the first baffle plate 11 is located nearby outflow side of the faucet while cold/hot water inlet 31, 32 is located at the remote side, "T"-shaped faucet could be placed on "Y"-shaped second 12, third 13 and fourth baffle plate 14 in a horizontal plane (as shown in FIG. 1), and used to separate cold/hot water inlet pipe 41 42 and outlet pipe 43 for a more convenient moulding. In the case of column faucet (as shown in FIG. 2), cold/hot water inlet's pipe column will not be punctured during machining by bar copper, thereby promoting efficiently the rate of finished products and reducing considerably the manufacturing cost for a higher availability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
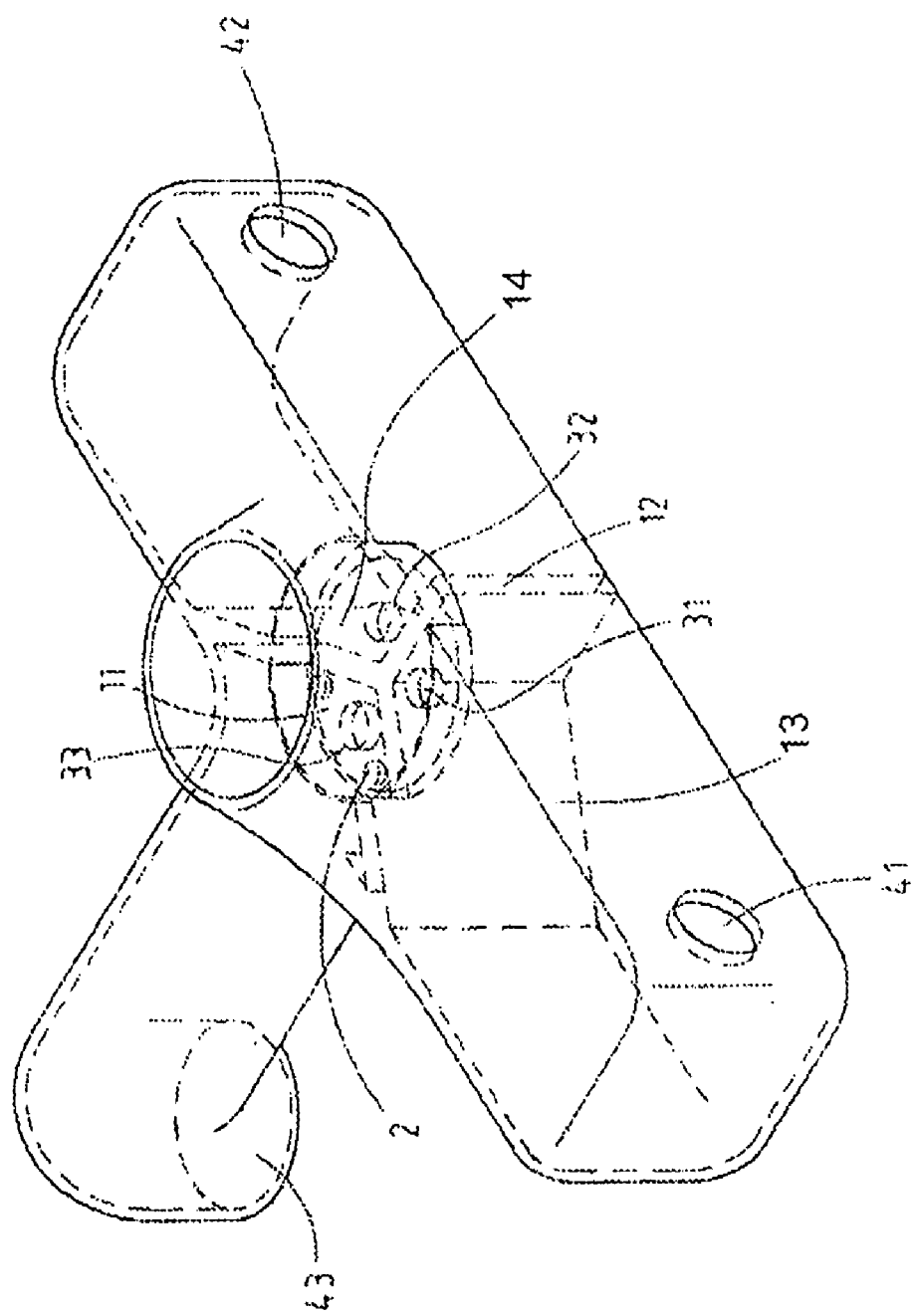
FIG. 1 shows a schematic view of the structure of the first embodiment of the present invention.

As shown in FIG. 1, the present invention has offered a preferred embodiment of water mixing single handle faucet (e.g. a T-shaped faucet) fitted with an improved water inlet and outlet. A circular groove, located on the first baffle plate 11 to accommodate the valve core, comprises a valve core location hole 2, cold water inlet 31, hot water inlet 32 and water outlet 33 mounted onto the first baffle plate 11. Among them, cold water inlet is connected to cold water inlet pipe 41, hot water inlet connected to hot water inlet pipe 42, and water outlet 33 connected to water outlet pipe 43 on the main body. Moreover, the water outlet 33 is located nearby outflow side of the faucet while cold/hot water inlet is located at the remote side.

As shown in FIG. 1, the faucet is fitted with a second 12, third 13 and fourth baffle plate 14 in a "Y"-shaped configuration, of which the second baffle plate 12 is placed between cold water inlet pipe 41 and hot water inlet pipe 42, the third baffle plate 13 placed between cold water inlet pipe 41 and water outlet pipe 43, and the fourth baffle plate 14 placed between hot water inlet pipe 42 and water outlet pipe 43. The inner ends of second, third and fourth baffle plates are tightly bonded, while the outer ends are separately sealed into inner wall of faucet body, such that the first baffle plate 11 is tightly covered onto the second, third and fourth baffle plates.

Figure 2:
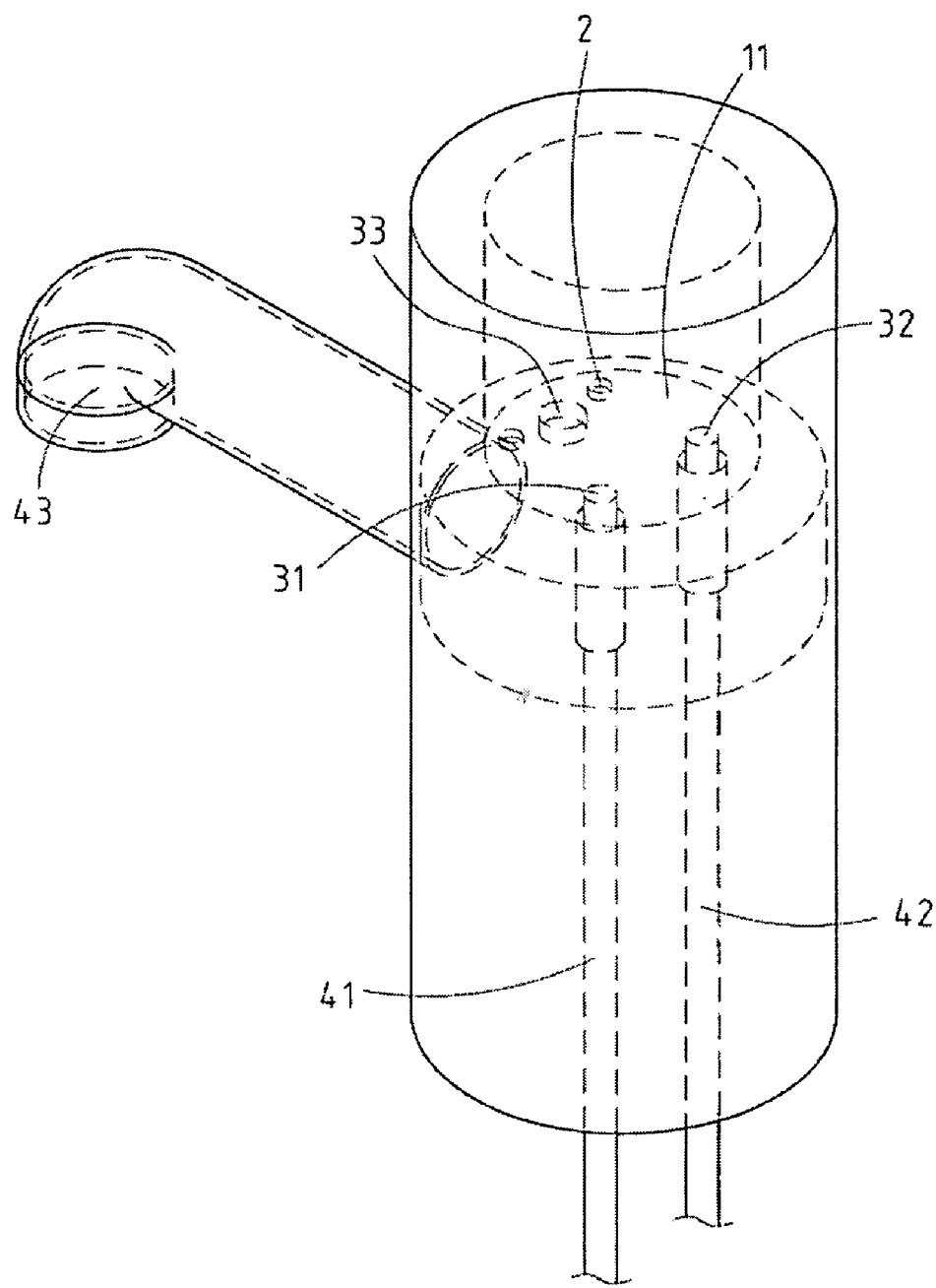
FIG. 2 shows another schematic view of the structure of the second embodiment of the present invention.

As shown in FIG. 2, the second preferred embodiment of the present invention is represented by a column faucet. A circular groove, located on the first baffle plate 11 to accommodate the valve core, comprises a valve core location hole 2, cold water inlet 31, hot water inlet 32 and water outlet 33 mounted onto the first baffle plate 11. Among them, cold water inlet 31 is connected to cold water inlet pipe 41, hot water inlet 32 connected to hot water inlet pipe 42, and water outlet 33 connected to water outlet pipe 43 on the main body. And, the water outlet 33 is located nearby outflow side of the faucet while cold/hot water inlet is located at the remote side.

The cold water inlet pipe 41 is fixedly connected to cold water inlet 31 on the first baffle plate, while hot water inlet pipe 42 is fixedly connected to hot water inlet 32 on the first baffle plate.

I claim:

1. A single-handle water mixing faucet comprising:
   a faucet body having an inner wall, said faucet body having a water outlet pipe, said faucet body having a circular groove formed on an interior thereof, said faucet body having a cold water inlet and a hot water inlet formed therein;

a first baffle plate received in said circular groove, said first baffle plate being disk-shaped, said first baffle plate suitable for supporting a valve core thereon, said first baffle plate having a valve core location hole thereon, said first baffle plate having a cold water inlet hole and a hot water inlet hole and a water outlet hole formed therethrough, said cold water inlet hole being in fluid communication with said cold water inlet of said faucet body, said hot water inlet hole being in fluid communication with said hot water inlet of said faucet body;

a second baffle plate having an outer end sealed to said inner wall of said faucet body and extending transversely thereto, said second baffle plate extending between said hot water inlet hole and said cold water inlet hole;

a third baffle plate having an outer end sealed to said inner wall of said faucet body and extending inwardly therefrom between said cold water inlet hole and said water outlet hole; and a fourth baffle plate having an outer end sealed to said inner wall of said faucet body and extending inwardly therefrom between said hot water inlet hole and said outlet hole, an opposite end of said second baffle plate and said third baffle plate and said fourth baffle plate being tightly bonded together, said second baffle plate and said third baffle plate and said fourth baffle plate arranged in a Y-shaped configuration, said first baffle plate having a bottom surface affixed directly onto a top edge of said second baffle plate and onto a top edge of said third baffle plate and onto a top edge of said fourth baffle plate.

* * * * *